US011375204B2

(12) United States Patent
Zhang et al.

(10) Patent No.: US 11,375,204 B2
(45) Date of Patent: Jun. 28, 2022

(54) FEATURE-DOMAIN RESIDUAL FOR VIDEO CODING FOR MACHINES

(71) Applicant: Nokia Technologies Oy, Espoo (FI)

(72) Inventors: Honglei Zhang, Tampere (FI); Hamed Rezazadegan Tavakoli, Espoo (FI); Francesco Cricri, Tampere (FI); Miska Matias Hannuksela, Tampere (FI); Emre Aksu, Tampere (FI); Nam Le, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/218,967

(22) Filed: Mar. 31, 2021

(65) Prior Publication Data

US 2021/0314573 A1  Oct. 7, 2021

Related U.S. Application Data

(60) Provisional application No. 63/006,331, filed on Apr. 7, 2020.

(51) Int. Cl.
*H04N 19/146* (2014.01)
*H04N 19/103* (2014.01)
*H04N 19/436* (2014.01)
*H04N 19/85* (2014.01)

(52) U.S. Cl.
CPC ......... *H04N 19/146* (2014.11); *H04N 19/103* (2014.11); *H04N 19/436* (2014.11); *H04N 19/85* (2014.11)

(58) Field of Classification Search
CPC .. H04N 19/103; H04N 19/146; H04N 19/436; H04N 19/85
See application file for complete search history.

(56) References Cited

U.S. PATENT DOCUMENTS

| 2011/0182352 A1* | 7/2011 | Pace | G06T 9/001 375/240.1 |
| 2016/0286226 A1* | 9/2016 | Ridge | H04N 19/50 |
| 2018/0332301 A1 | 11/2018 | Tian et al. | 19/172 |

(Continued)

FOREIGN PATENT DOCUMENTS

| CN | 107454412 A | 12/2017 |
| CN | 110324626 A | 10/2019 |
| EP | 3633990 A1 | 4/2020 |

(Continued)

OTHER PUBLICATIONS

U.S. Appl. No. 62/909,475, filed Oct. 2, 2019.

*Primary Examiner* — Mohammed S Rahaman
(74) *Attorney, Agent, or Firm* — Joseph C. Drish; Harrington & Smith

(57) ABSTRACT

An apparatus includes at least one processor; and at least one non-transitory memory including computer program code; wherein the at least one memory and the computer program code are configured to, with the at least one processor, cause the apparatus at least to: decode encoded data to generate decoded data, the encoded data having a bitrate lower than that of original data, and extract features from the decoded data; decode encoded residual features to generate decoded residual features; and generate enhanced decoded features as a result of combining the decoded residual features with the features extracted from the decoded data.

20 Claims, 13 Drawing Sheets

(56) References Cited

U.S. PATENT DOCUMENTS

2021/0174031 A1* 6/2021 Wang .................. G06F 40/30
2021/0203997 A1* 7/2021 Veselov ................ H04N 19/70

FOREIGN PATENT DOCUMENTS

| KR | 20180108288 A | * | 4/2018 | ............. G06N 3/084 |
| KR | 20180108288 A | | 10/2018 | |
| WO | WO-2020/070376 A1 | | 4/2020 | |

* cited by examiner

FEATURE-DOMAIN RESIDUAL FOR VIDEO CODING FOR MACHINES

RELATED APPLICATION

This application claims the benefit of U.S. Provisional Application No. 63/006,331, filed Apr. 7, 2020, which is incorporated by reference in its entirety.

TECHNICAL FIELD

The examples and non-limiting embodiments relate generally to multimedia transport and neural networks and, more particularly, to feature-domain residual for video coding for machines.

BACKGROUND

It is known to provide standardized formats for exchange of neural networks.

SUMMARY

In accordance with an aspect, an apparatus includes at least one processor; and at least one non-transitory memory including computer program code; wherein the at least one memory and the computer program code are configured to, with the at least one processor, cause the apparatus at least to: encode original data with a first codec to generate encoded data with a bitrate lower than that of the original data, and decoded data; encode the original data with at least one second learned codec to generate encoded residual features and decoded residual features; and generate enhanced decoded features as a result of combining the decoded residual features with features extracted from the decoded data generated with the first codec.

In accordance with an aspect, an apparatus includes at least one processor; and at least one non-transitory memory including computer program code; wherein the at least one memory and the computer program code are configured to, with the at least one processor, cause the apparatus at least to: decode encoded data to generate decoded data, the encoded data having a bitrate lower than that of original data, and extract features from the decoded data; decode encoded residual features to generate decoded residual features; and generate enhanced decoded features as a result of combining the decoded residual features with the features extracted from the decoded data.

In accordance with an aspect, a method includes decoding encoded data to generate decoded data, the encoded data having a bitrate lower than that of original data, and extracting features from the decoded data; decoding encoded residual features to generate decoded residual features; and generating enhanced decoded features as a result of combining the decoded residual features with the features extracted from the decoded data.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
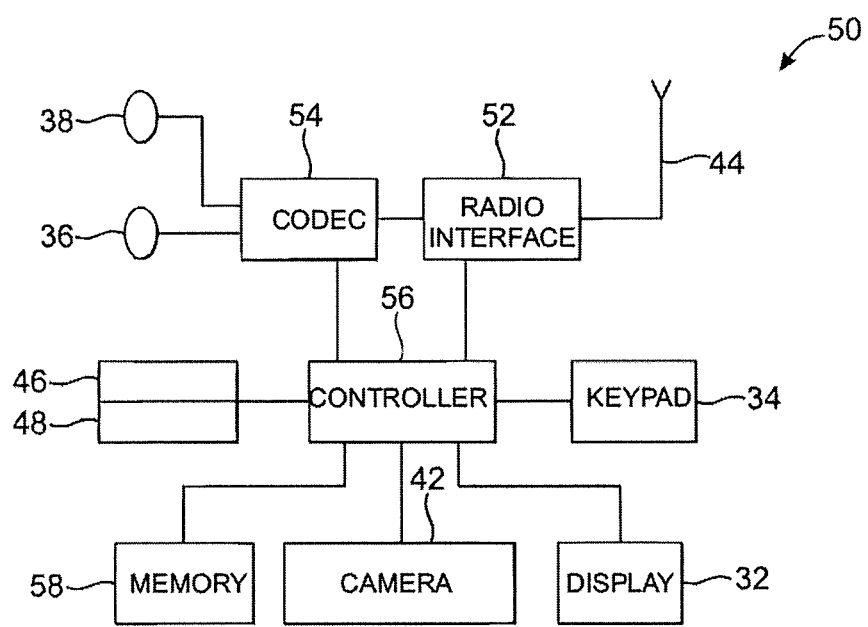
FIG. 1 shows schematically an electronic device employing embodiments of the examples described herein.

When more than one drawing reference numeral is used herein with "/", the "/" may be interpreted as either "or", "and", or "both".

Figure 2:
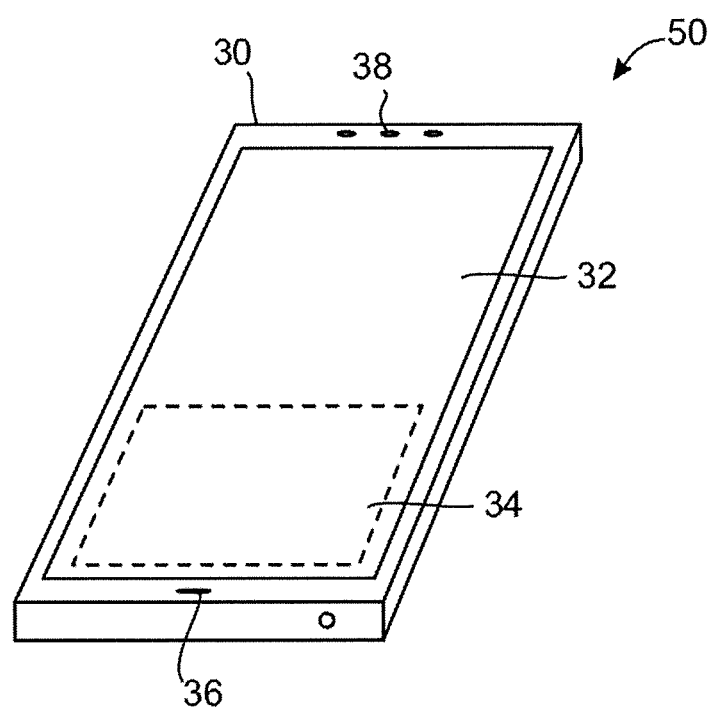
FIG. 2 shows schematically a user equipment suitable for employing embodiments of the examples described herein.

The following describes in detail a suitable apparatus and possible mechanisms for a video/image encoding process according to embodiments. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 are explained next.

The electronic device 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analog signal input. The apparatus 50 may further comprise an audio output device which in embodiments of the examples described herein may be any one of: an earpiece 38, speaker, or an analog audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
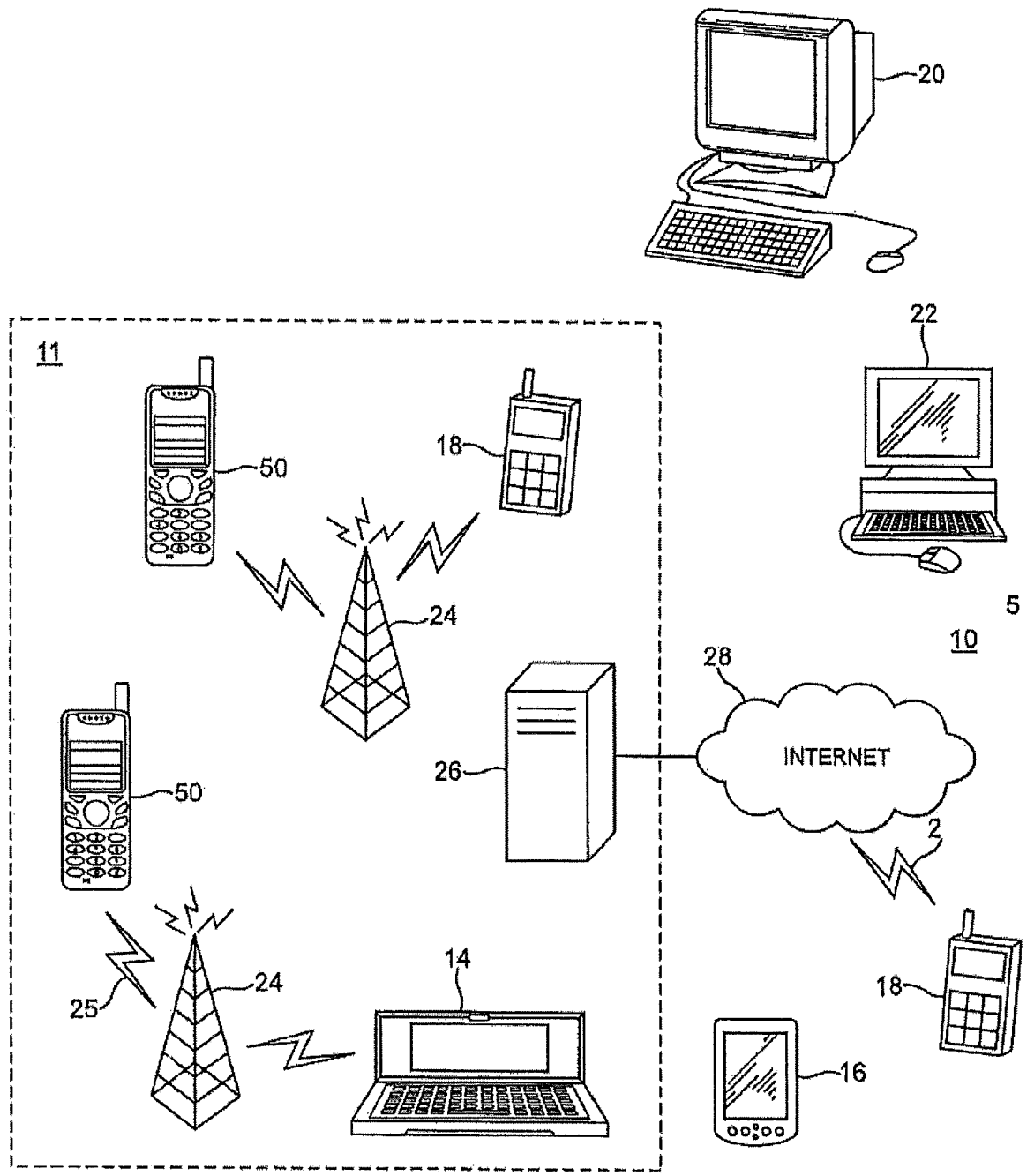
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, etc. to be included in the Internet of Things (IoT). In order to utilize the Internet IoT devices are provided with an IP address as a unique identifier. IoT devices may be provided with a radio transmitter, such as a WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

A video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically the encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process as temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in the spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
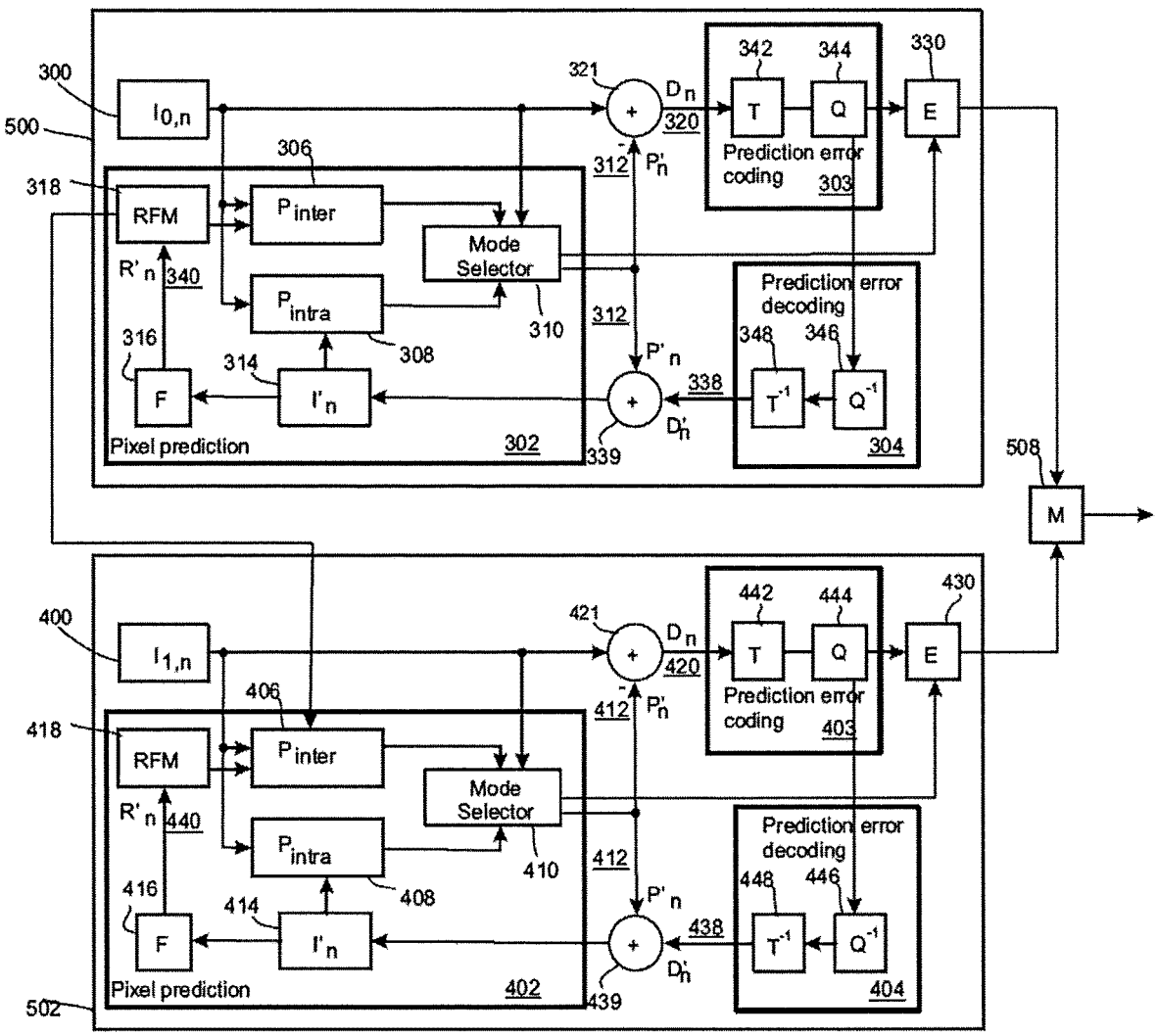
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406 ($P_{inter}$), an intra-predictor 308, 408 ($P_{intra}$), a mode selector 310, 410, a filter 316, 416 (F), and a reference frame memory 318, 418 (RFM). The pixel predictor 302 of the first encoder section 500 receives 300 base layer images ($I_{0,n}$) of a video stream to be encoded at both the inter-predictor 306 (which determines the difference between the image and a motion compensated reference frame 318) and the intra-predictor 308 (which determines a prediction for an image block based only on the already processed parts of the current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300.

Correspondingly, the pixel predictor 402 of the second encoder section 502 receives 400 enhancement layer images ($I_{1,n}$) of a video stream to be encoded at both the inter-predictor 406 (which determines the difference between the image and a motion compensated reference frame 418) and the intra-predictor 408 (which determines a prediction for an image block based only on the already processed parts of the current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 (Do) which is input to the prediction error encoder 303, 403.

The pixel predictor 302, 402 further receives from a preliminary reconstructor 339, 439 the combination of the prediction representation of the image block 312, 412 (P'n) and the output 338, 438 (D'$_n$) of the prediction error decoder 304, 404. The preliminary reconstructed image 314, 414 (I'n) may be passed to the intra-predictor 308, 408 and to the filter 316, 416. The filter 316, 416 receiving the preliminary representation may filter the preliminary representation and output a final reconstructed image 340, 440 (R'$_n$) which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be the source for inter-layer sample prediction and/or inter-layer motion information prediction of the enhancement layer according to some embodiments, the reference frame memory 318 may also be connected to the inter-predictor 406 to be used as the reference image against which a future enhancement layer picture 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be the source for predicting the filtering parameters of the enhancement layer according to some embodiments.

The prediction error encoder 303, 403 comprises a transform unit 342, 442 (T) and a quantizer 344, 444 (Q). The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder 304, 404 may be considered to comprise a dequantizer 346, 446 (Q$^{-1}$), which dequantizes the quantized coefficient values, e.g. DCT coefficients, to reconstruct the transform signal and an inverse transformation unit 348, 448 (T$^{-1}$), which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 (E) receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508 (M).

Fundamentals of neural networks. A neural network (NN) is a computation graph consisting of several layers of computation. Each layer consists of one or more units, where each unit performs an elementary computation. A unit is connected to one or more other units, and the connection may be associated with a weight. The weight may be used for scaling the signal passing through the associated connection. Weights are learnable parameters, i.e., values which can be learned from training data. There may be other learnable parameters, such as those of batch-normalization layers.

Two widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside a certain layer take input from units in one or more of preceding layers, and provide output to one or more of the following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

An important property of neural nets (and other machine learning tools) is that they are able to learn properties from input data, either in supervised way or in unsupervised way. Such learning is a result of a training algorithm, or of a meta-level neural network providing the training signal.

In general, the training algorithm consists of changing some properties of the neural network so that its output is as close as possible to a desired output. For example, in the case of classification of objects in images, the output of the neural network can be used to derive a class or category index which indicates the class or category that the object in the input image belongs to. Training usually happens by minimizing or decreasing the output's error, also referred to as the loss. Examples of losses are mean squared error, cross-entropy, etc. In recent deep learning techniques, training is an iterative process, where at each iteration the algorithm modifies the weights of the neural net to make a gradual improvement of the network's output, i.e., to gradually decrease the loss.

In this description of the provided examples, the terms "model", "neural network", "neural net" and "network" are used interchangeably, and also the weights of neural networks are sometimes referred to as learnable parameters or simply as parameters.

Training a neural network is an optimization process, but the final goal is different from the typical goal of optimization. In optimization, the only goal is to minimize a function.

In machine learning, the goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data is usually split into at least two sets, the training set and the validation set. The training set is used for training the network, i.e., to modify its learnable parameters in order to minimize the loss. The validation set is used for checking the performance of the network on data which was not used to minimize the loss, as an indication of the final performance of the model. In particular, the errors on the training set and on the validation set are monitored during the training process to understand the following items.

First, errors on the training set and on the validation set are monitored during the training process to understand if the network is learning at all—in this case, the training set error should decrease, otherwise the model is in the regime of underfitting.

Second, errors on the training set and on the validation set are monitored during the training process to understand if the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set, but performs poorly on a set not used for tuning its parameters.

Lately, neural networks have been used for compressing and de-compressing data such as images. The most widely used architecture for such task is the auto-encoder, which is a neural network consisting of two parts: a neural encoder and a neural decoder (herein referred to simply as encoder and decoder, even though the examples described herein refer to algorithms which are learned from data instead of being tuned by hand). The encoder takes as input an image and produces a code which requires less bits than the input image. This code may have been obtained by additional steps after the encoder, such as a quantization process and lossless encoding. The decoder takes in this code and reconstructs the image which was input to the encoder. There may be additional steps being performed before the decoder neural network, such as lossless decoding and dequantization.

Such an encoder and decoder are usually trained to minimize a combination of bitrate and distortion, where the distortion is usually Mean Squared Error (MSE), PSNR, SSIM, or similar metrics. These distortion metrics are meant to be inversely proportional to the human visual perception quality. Examples of training loss used to minimize or reduce the bitrate are: an L1 norm computed on the output of the encoder network or on the output of the quantization process; $L1(x)/L2(x)$ where $L1(\ )$ and $L2(\ )$ are the L1 norm and L2 norm, respectively, and x is the output of the encoder network or the output of the quantization process; or an estimate or approximation of entropy of the output of the encoder network or the output of the quantization process.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in the spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as a prediction reference for the forthcoming frames in the video sequence.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of the previously coded/decoded picture can be predicted. The reference index is typically predicted from adjacent blocks and/or or co-located blocks in the temporal reference picture. Moreover, typical high efficiency video codecs employ an additional motion information coding/decoding mechanism, often called merging/merge mode, where all the motion field information, which includes a motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidates filled with motion field information of available adjacent/co-located blocks.

In typical video codecs the prediction residual after motion compensation is first transformed with a transform kernel (like DCT) and then coded. The reason for this is that often there still exists some correlation among the residual and the transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area, where the cost function is of the form $C=D+\lambda R$, where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Background information on Video Coding for Machines (VCM). Reducing the distortion in image and video compression is often intended to increase human perceptual quality, as humans are considered to be the end users, i.e. consuming/watching the decoded image. Recently, with the advent of machine learning, especially deep learning, there is a rising number of machines (i.e., autonomous agents) that analyze data independently from humans and that may even take decisions based on the analysis results without human intervention. Examples of such analysis are object detection, scene classification, semantic segmentation, video event detection, anomaly detection, pedestrian tracking, etc. Example use cases and applications are self-driving cars, video surveillance cameras and public safety, smart sensor networks, smart TV and smart advertisement, person re-identification, smart traffic monitoring, drones, etc. This fact may raise the issue that, when decoded data is consumed by machines, the aim should potentially be for a different quality metric—other than human perceptual quality—when considering media compression in inter-machine communications. Also, dedicated algorithms for compressing and decompressing data for machine consumption are likely to be different than those for compressing and decompressing data for human consumption. The set of tools and concepts for compressing and decompressing data for machine consumption is referred to here as Video Coding for Machines.

It is likely that the receiver-side device has multiple "machines" or neural networks (NNs). These multiple machines may be used in a certain combination which is for example determined by an orchestrator sub-system. The multiple machines may be used for example in succession, based on the output of the previously used machine, and/or in parallel. For example, a video which was compressed and then decompressed may be analyzed by one machine (NN) for detecting pedestrians, by another machine (another NN) for detecting cars, and by another machine (another NN) for estimating the depth of all the pixels in the frames.

With respect to the examples described herein, machine and neural network are referred to interchangeably, and mean any process or algorithm (learned or not from data) which analyzes or processes data for a certain task. Throughout this description, other assumptions made regarding the machines considered by the examples described herein may be specified in further details.

Also, as used herein, the term "receiver-side" or "decoder-side" refers to the physical or abstract entity or device which contains one or more machines, and runs these one or more machines on some encoded and eventually decoded video representation which is encoded by another physical or abstract entity or device, the "encoder-side device". In some cases, the two devices (encoder-side device and decoder-side device) may be parts of a single device or abstract entity.

The encoded video data may be stored into a memory device, for example as a file. The stored file may later be provided to another device. Alternatively, the encoded video data may be streamed from one device to another.

One of the possible approaches to perform video encoding and decoding for machines is to use a conventional codec, such as the Versatile Video Coding standard (also known as VVC and H.266), to encode the input image or video into a low bitrate code, and to use neural networks to encode and decode additional data which aids the task neural networks. In general, the conventional codec may even be a learned and fixed model.

Figure 5:
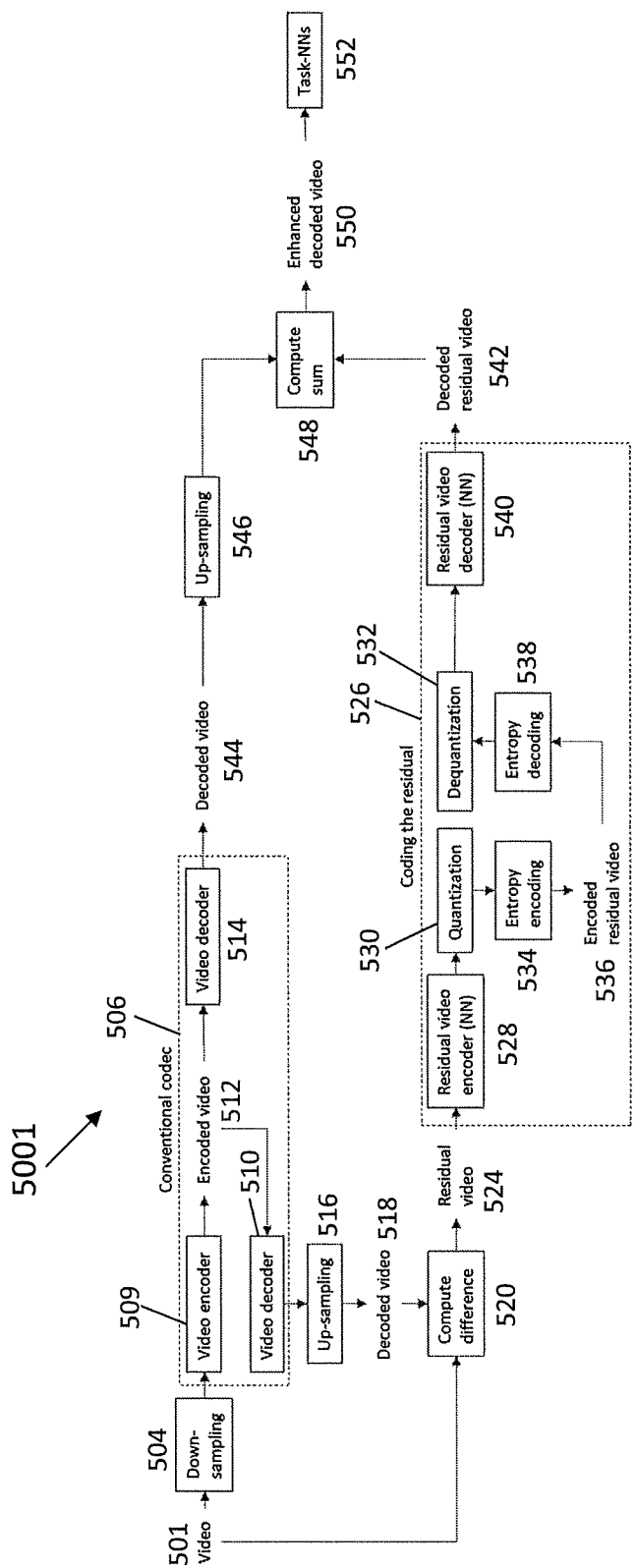
FIG. 5 is a block diagram depicting use of neural networks to encode and decode data for use by at least one task NN.
Figure 6:
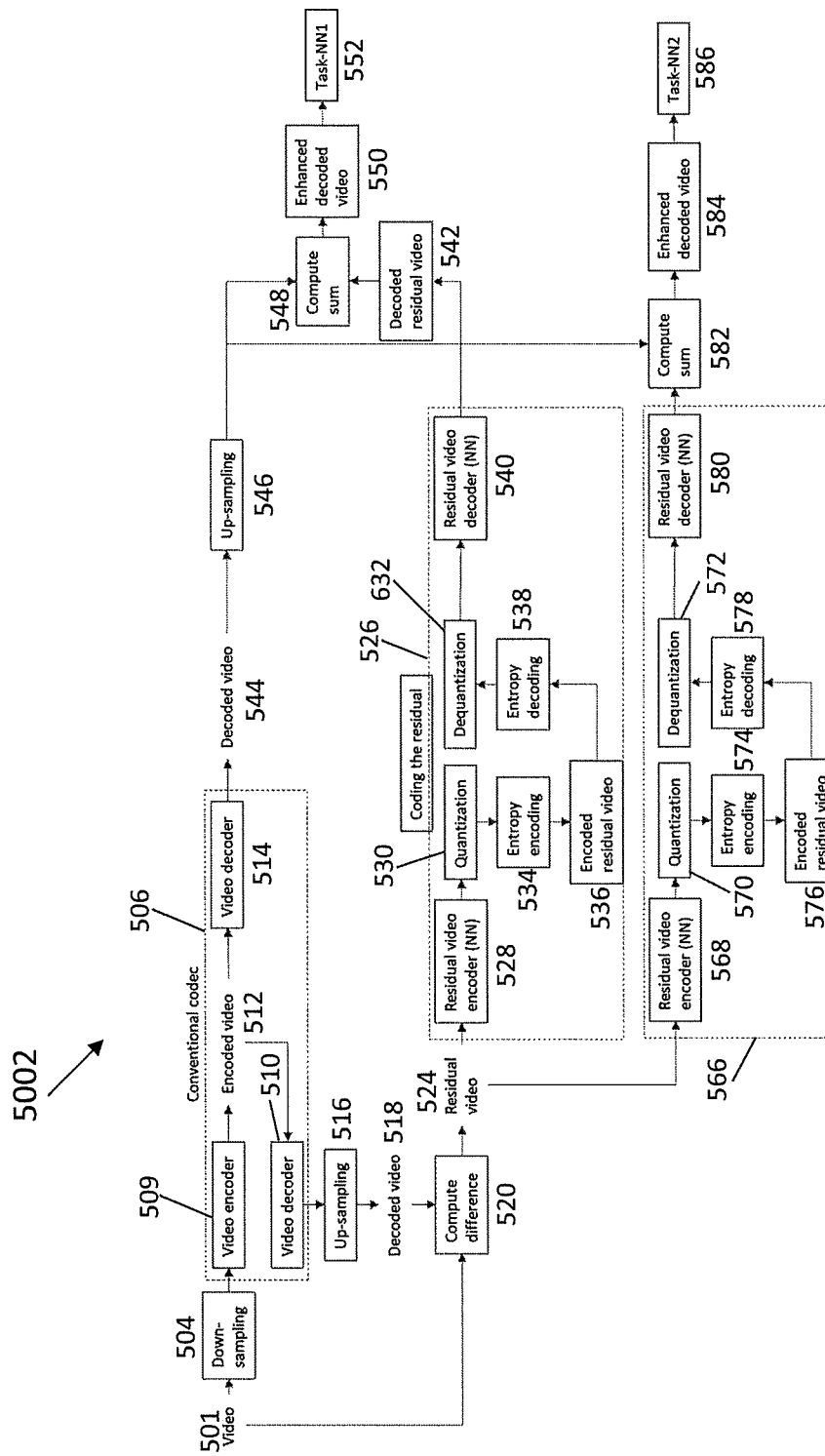
FIG. 6 is a block diagram illustrating the case where different neural auto-encoders are used to encode and decode the feature residual for different task-NNs.

FIG. 5 is a block diagram 5001 depicting use of neural networks to encode and decode residual video for use by at least one task NN. FIG. 6 is a block diagram 5002 illustrating the case where different neural auto-encoders are used to encode and decode the residual video for different task-NNs.

The low bitrate code (bitstream) may be achieved for example by first down-sampling 504 the input data 501 to a lower resolution, before the encoding process, and then up-sampling (516 and 546) the output of the decoder (510 and 514). An additional or alternative way to achieve a low bitrate is to use a high quantization parameter QP.

As the low bitrate code may not be sufficient for achieving high performance of task-NNs 552/586, a residual 524 is computed 520 based on the original data 501 (ground-truth data) and the output 518 of the conventional decoder 510, eventually after, being up-sampled 516. For example, the residual 524 may be computed 520 by subtracting the original data 501 from the output 518 of the conventional decoder 510. The residual 524 is then encoded and decoded 526/566 by one or more neural networks—typically one neural network for each task. Each of these NNs may be an auto-encoder, formed by an encoder neural network 528/568 and a decoder neural network 540/580. Between the neural encoder 528/568 and decoder 540/580 there may be lossy and/or lossless compression steps, such as quantization 530/570 and entropy coding. The entropy coding may include entropy encoding 534/574 and entropy decoding 538/578. As shown collectively by FIG. 5 and FIG. 6, the entropy encoding 534/574 generates encoded residual video 536/576 which is then decoded by entropy decoding 538/578. Quantization 530/570 may be for example one of the following: uniform scalar quantization, non-uniform scalar quantization, codebook-based quantization. Entropy coding may be for example arithmetic coding. Dequantization 532/572 includes dequantizing the output of entropy decoding 538/578.

At decoder side, the decoded residual signal 542 is then combined with the data 544 decoded by the conventional decoder 514. Combination may be for example a sum 548/582. The output 550/584 of the combination may be processed by a post-processor, such as another neural network 552/586.

The neural networks in this approach may be trained to minimize a certain cost function. This function may consist of one or more distortion functions and of one or more compression loss functions.

FIG. 5 illustrates one possible block diagram 5001 of this approach, where a single neural auto-encoder 526 is used for encoding 528 and decoding 540 the feature residual 524 for one or more task-NNs 552.

FIG. 5 illustrates an approach where a conventional low-bitrate bitstream is achieved by downsampling 504 the input video 501 before encoding 506. It needs to be understood that FIG. 5 similarly applies to other additional and alternative approaches for achieving a low-bitrate bitstream as described above.

FIG. 5 (and FIG. 6) presents a video encoder block 509 and a video decoder block 510 at the encoder side as separate blocks. Many times a video encoder block 509 reconstructs the decoded video as a part of the encoding process 506 and thus a separate video decoding block 510 might not be needed. As shown, the video encoder block 509 generates an encoded signal 512 (e.g., video) as input to the video decoder 510/514.

FIG. 6 is a block diagram 5002 illustrating the case where different neural auto-encoders (namely auto-encoder 526 and auto-encoder 566) are used to encode and decode the video residual 524 for different task-NNs (namely Task-NN1 552 and Task-NN2 586).

However, this approach does not optimize the rate-distortion for the case where the task-NNs 552/586 at the decoder-side take features as inputs (instead of video), because it is designed to enhance decoded video 550/584 instead of decoded features.

In FIG. 5 and FIG. 6, video decoder 510, up-sampling 516, and decoded video 518 are shown as being different entities, respectively, from video decoder 514, up-sampling 546, and decoded video 544. In some examples, the entities may be the same (e.g., the same data or copy of the same data, or the same module or copy of the same module).

Research in the general domain of video coding and neural networks include international application number PCT/FI2019/050674 entitled "Compression for Machines", EP application no. 19198496.2-1280 (published on Apr. 8, 2020 as 3633990) entitled "Rate-distortion Optimized Video/Image Coding Tuned for Machines", U.S. provisional application No. 62/909,475 entitled "Joint Video Encoding and Neural Network Update for Machine-Targeted Content", and FI national application 20205026 entitled "Supporting Dynamic Switching Between Tasks for Machine Targeted Video Coding".

Figure 7:
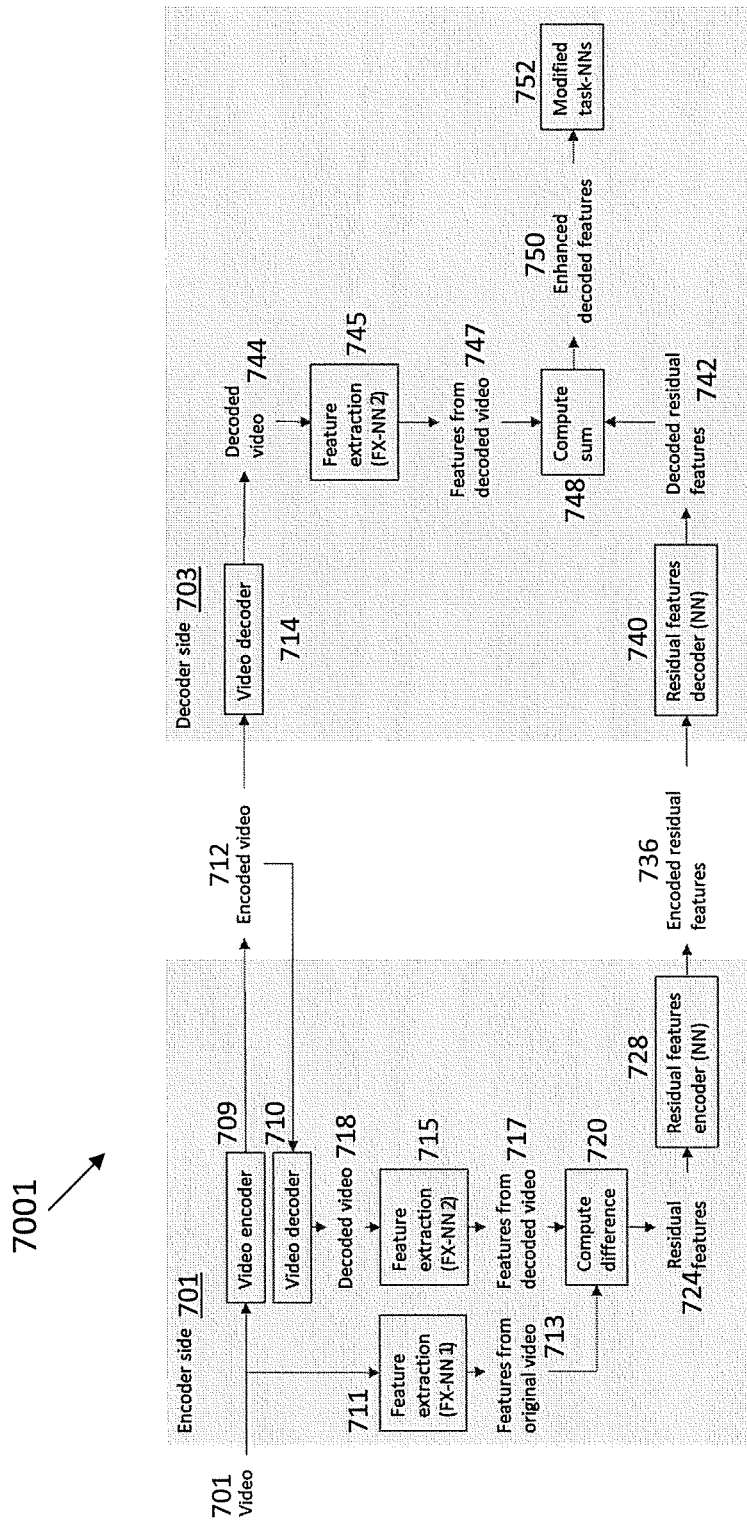
FIG. 7 is an example block diagram for implementing an encoder and a decoder targeting video coding for machines, based on the examples described herein.

Described herein is an encoder and a decoder targeting video coding for machines, which is based on using a conventional codec and a learned codec, where the learned codec is optimized for aiding the reconstruction of features. FIG. 7 is an example block diagram 7001 for implementing an encoder and a decoder targeting video coding for machines, based on the examples described herein. An encoder side 701 and a decoder side 703 according to an embodiment are illustrated in FIG. 7 and described herein.

Encoder side 701. A conventional video encoder 709 is used to encode video data 701 at a relatively low bitrate. FIG. 7 presents a video encoder block 709 and a video decoder block 710 at the encoder side 701 as separate blocks. It needs to be understood that many times a video encoder block 709 reconstructs the decoded video 718 as a part of the encoding process and thus a separate video decoding block 710 might not be needed.

The low bitrate bitstream may be achieved for example by first down-sampling the input data to a lower resolution, before the encoding process, and then up-sampling the output of the video decoder (also at the decoder side 703). The downsampling may be considered to be a part of the video encoder 709 or a pre-processing block for the video encoder 709, and the upsampling may be considered to be a part of the video decoder 710 or a post-processing block for the video decoder 710. An additional or alternative way to achieve a low bitrate is to use a high quantization parameter QP. An additional or alternative way to achieve a low bitrate is to tune the lambda parameter in the rate-distortion optimized mode selection to favor low bitrate over high quality.

Features 713 are extracted by a NN 711 applied on the original video data 701. Features 717 are extracted by a NN 715 applied on the data 718 decoded by the conventional decoder 710. A residual of features 724 is computed in the "compute difference" block 720. Then, this feature residual 724 is encoded by a neural network 728, such as an encoder part of an auto-encoder and additional compression steps. The "compute difference" block 720 computes the difference between the features 717 extracted 715 from the decoded video 718 and the features 713 extracted 711 from the original video 701. The feature extraction 711/715 may be performed by a neural network (e.g., FX-NN1 711 and FX-NN2 715).

Decoder side 703. A conventional video bitstream 712 is decoded with a conventional video decoder 714. The decoded video 744 may be upsampled as discussed in the encoder side 701 description.

Features are extracted by a NN 745 applied on the data 744 decoded by the conventional decoder 714. The encoded residual features 736 are decoded by a neural network 740 (such as the decoder part of an auto-encoder and additional decompression steps).

The decoded residual features 742 are used to enhance the features 747 extracted 745 from the video 744 decoded by the conventional decoder 714. In the "Compute sum" block 748 the decoded residual features 742 are combined with the features 747 extracted 745 from the data 744 decoded by the conventional decoder 714 to derive enhanced decoded features 750.

A task NN 752 may be used to process or analyze enhanced decoded features 750. The task NN 752 may be regarded as a part of the decoder side 703 or may be another entity, separate from the decoder side 703. Further details of both the encoder side 701 and decoder side 703 are provided herein.

The feature-extraction neural network (FX-NN) at the encoder side 701 (namely FX-NN2 715) and decoder side 703 (namely FX-NN2 745) may be the same or may be different. Similarly, FX-NN1 711 and FX-NN2 715 may be the same or may be different. Similarly, FX-NN1 711 and FX-NN2 745 may be the same or may be different. In a typical embodiment, FX-NN1 711, FX-NN2 715 and FX-NN2 745 may be the same. In one embodiment, one or more of the task-NNs 752 accept features as input. In one alternative embodiment, one or more of the task-NNs 752 accept visual data as input (such as images, video, etc.). In one alternative embodiment (shown by FIG. 9), for the case where the task-NNs 752 accept visual data as input, the enhanced data is generated by an additional neural network which combines the video 744 decoded by the conventional decoder 714 and the enhanced decoded features 750.

In one alternative embodiment (shown by FIG. 10), for the case where the task-NNs 752 accept as input visual data, the enhanced data is generated by an additional neural network which combines the video 744 decoded by the conventional decoder 714 and decoded residual features 742.

In one alternative embodiment, the encoder 728 and decoder 740 of residual features (724 and 736) are not neural networks, but may be any encoder and decoder, for example an image or video encoder and decoder. In this case, residual features encoder 728 may include a conversion from residual features 724 to feature map images in order to make them more suitable to be encoded by a conventional encoder such as H.266 based encoder. Residual features decoder 740 may include a conversion from decoded feature map images to decoded residual features 742.

In the examples provided and described herein, the goal is to obtain a codec which targets the compression and decompression of data which is consumed by machines. In some embodiments it is possible that the decompressed data may also be consumed by humans, either at the same time or at different times with respect to when the machines consume the decompressed data. However, the examples described herein focus on describing the compression and decompression of data for machines.

In the case where some components of the proposed encoder and decoder are optimized at the development stage with respect to the task-NNs performance (such as when there are neural networks in the encoder and/or in the decoder), it is assumed that at least some of the task-NNs (machines) are models, such as neural networks, for which it is possible to compute a distortion that can be used to optimize some of the components of the encoder and/or decoder. In case there are neural networks in the encoder and/or decoder, the distortion may be a training signal for training neural networks in the encoder and/or decoder. The training signal may comprise the gradients of the output of one or more task-NN with respect to their input. For example, if the task-NNs are parametric models, gradients of their output may be computed first with respect to their internal parameters and then with respect to their input, by using the chain rule for differentiation in mathematics. In the case of neural networks, backpropagation may be used to obtain the gradients of the output of a NN with respect to its input.

The task-NNs that may be available during the development stage are representative of the task-NNs which may be used at inference time, i.e., when the codec may be deployed and used for compressing and decompressing data.

The task-NNs available during the development stage may have been previously trained. The data in the domain suitable to be input to the task-NNs available during the development stage may be available during the development stage. In some cases, this data may not be annotated, i.e., may not contain ground-truth labels.

The examples provided and described herein are not restricted to any specific type of data. However, for the sake of simplicity video data is considered for illustration purposes. Although, other example types of data that are relevant to the examples described herein include images, audio, speech, and text.

Main Embodiments. Described herein is an encoder and a decoder which encode the input video data into a base layer in the video domain and an enhancement layer in the feature domain. The terms base layer and enhancement layer are conceptual. They may but need not correspond to scalability layers of a multi-layer video codec. Options for arranging the base layer and enhancement layer signal are described subsequently.

Figure 8:
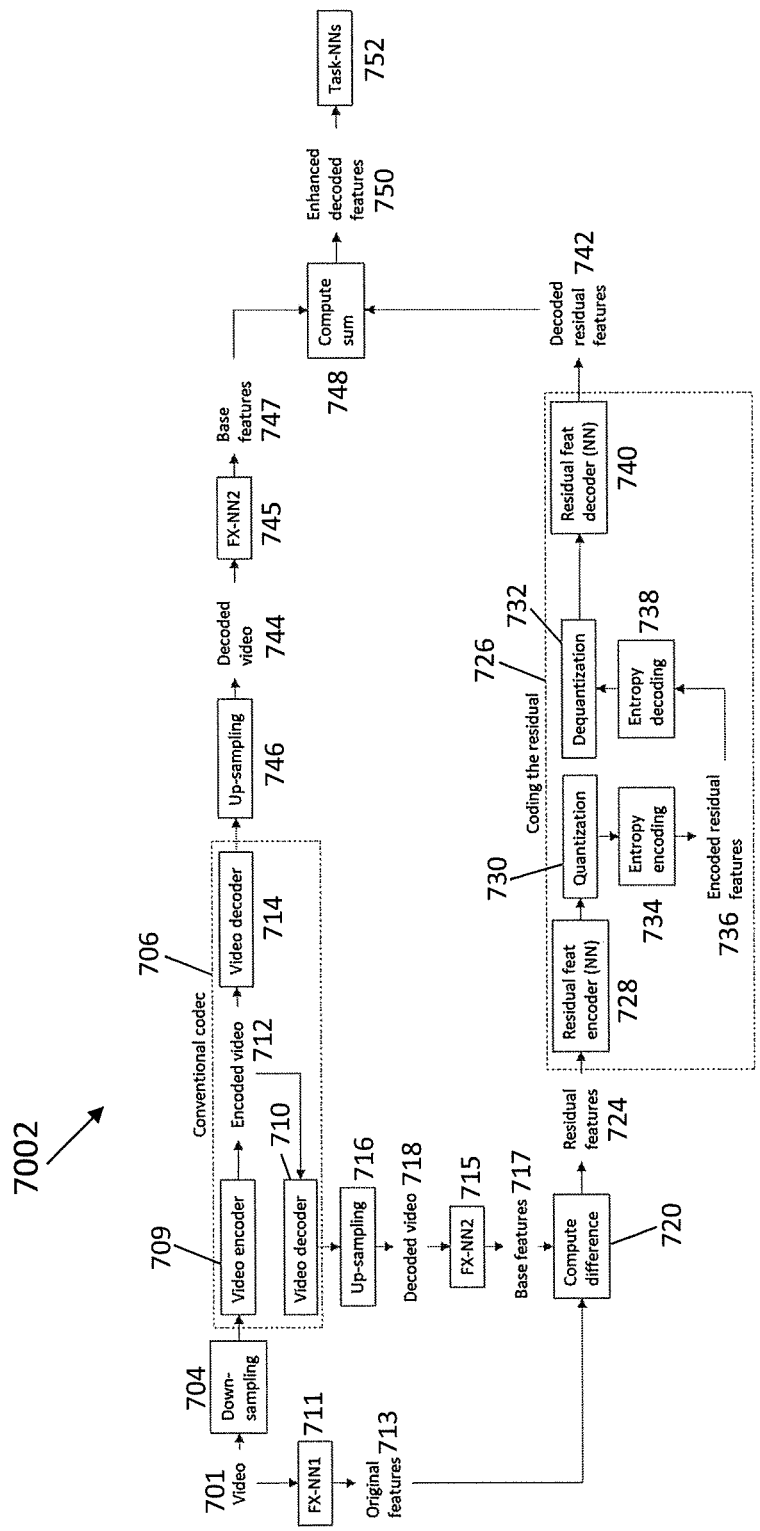
FIG. 8 is another example block diagram for implementing an encoder and a decoder targeting video coding for machines, based on the examples described herein.

FIG. 8 is another example block diagram 7002 for implementing an encoder and a decoder targeting video coding for machines, based on the examples described herein.

The base layer may be obtained by using a conventional encoder 706 such as one which is compatible with the H.266 standard. The base layer may be encoded to low bitrates, for example by using a high quantization parameter (QP) or by down-sampling 704 the input video 701 before the encoding process. If down-sampling 704 is applied, the video 712 decoded by the conventional decoder 710 may need to be up-sampled 716 to its original resolution.

In an alternative embodiment, the base layer may be obtained by using a non-conventional encoder, such as a learned model. This model may be a neural network encoder. The decoding of the base layer may also be performed by a learned model such as a neural network decoder.

At the decoder side, the video 712 decoded (and eventually up-sampled 746) by the conventional decoder 714 is input 744 to a feature-extraction neural network (FX-NN) (such as FX-NN2 745), which extracts features. These may be referred to as base layer reconstructed features, or base features 747 for short. However, these base features 747 may not be sufficient for achieving a satisfactory performance of task-NNs 752.

In order to enhance the base features 747, residual features 724 are encoded in the following way. First, a feature residual signal 724 is computed 720 from the base features 717 and the original features 713. The original features 713 are features extracted (such as by FX-NN1 711) from the original (ground-truth) video 701. For example, a subtraction may be computed 720 between the two tensors. The computed feature residual 724 is then encoded 728 and decoded 740 by one or more auto-encoders based codecs 726.

In one embodiment, there may be a single auto-encoder based codec (such as codec 726) for all task-NNs. In another embodiment, different auto-encoder based codecs for different task-NNs may be used. In another embodiment, multiple auto-encoder based codecs are used, where some of these codecs may be used for more than one task-NN (similar to FIG. 6).

An auto-encoder based codec 726 may comprise a neural network functioning as encoder 728 (for example, reducing the entropy of its input), a quantization step 730, an entropy encoding step 734, an entropy decoding step 738, a dequantization step 732, and a neural network functioning as decoder 740. As shown by the example of FIG. 8, the entropy decoding 738 decodes the encoded residual features 736 generated by the entropy encoding 734.

Other architectures may be used for encoding and decoding the feature residual 724. In one alternative embodiment, the feature residual 724 for one or more task-NNs 752 is encoded and decoded 726 by other types of algorithms than neural networks, such as other learned models or non-learned algorithms. Residual features encoder 728 may include a conversion from residual features to feature map images. Residual features decoder 740 may include a conversion from decoded feature map images to decoded residual features.

The decoded feature residual 742 is combined with the decoded base features 747, for example by summation 748. The resulting features may be referred to as enhanced features 750. The enhanced features 750 are input to one or more task-NNs 752. Here, these task-NNs 752 were trained to accept features 750 as input data, as opposed to other task-NNs which were trained to accept video or images as input data. FIG. 8 as described illustrates one of the main ideas.

In practice, video encoders may reconstruct the decoded video as a "by-product" of the encoding, i.e. no separate video decoder block (such as video decoder 710) in the encoder side is needed.

In one embodiment, the FX-NN1 711 (which extracts features from the original video 701) and FX-NN2, such as FX-NN2 715 and FX-NN2 745 (which extracts features from the video decoded—including decoded video 718 and/or decoded video 744 —by the base layer codec), are different neural networks, in either the weights or the architecture, or both. However, in case the feature residual 724 is computed as a simple subtraction, the two FX-NNs (including FX-NN1 711 and FX-NN2 715 and/or FX-NN2 745) may need to output tensors of same shape. Alternatively, post-processing is applied to make sure that the tensors' dimensions match.

In another embodiment, FX-NN1 711 and FX-NN2 (such as FX-NN2 715 and/or FX-NN2 745) are the same in either the weights or the architecture, or both.

Furthermore, each of the feature extraction NNs (including FX-NN1 711, FX-NN2 715, and/or FX-NN2 745) may belong to one of the following categories:

- Pre-trained and "frozen" (i.e., not anymore modified after pre-training) when training other NNs in the encoder and/or decoder.
- Pre-trained and fine-tuned when training other NNs in the encoder and/or decoder.
- Trained from scratch (e.g., from random initialization of the weights) together with other NNs in the encoder and/or decoder.

The FX-NNs (including FX-NN1 711, FX-NN2 715, and/or FX-NN2 745) need not be neural networks, but can be other types of feature extractors.

The training of the neural networks in the feature residual encoder 728 and decoder 740 may be performed by first computing a task loss for one or more task-NNs 752, and a compression loss on the output of the encoder. These losses may be computed by using a sufficiently big dataset, which is representative of the data that may be used at the deployment stage. For supervised tasks, the loss computation may need the availability of ground-truth labels. The dataset may contain such ground-truth labels for one or more task-NNs 752. For those supervised tasks for which there's no availability of labels, it may be possible to obtain non-ground-truth labels (sometimes referred to as soft labels) by running the task-NNs 752 on the original data (i.e., the data which is input to the encoder), using the obtained output of the task-NNs 752 as the labels for computing the loss of the task-NNs 752 when the input data is the enhanced decoded data 750, and using this loss for training NNs in the encoder 728 and/or decoder 740. For a task-NN performing a classification task, an example of loss of the task-NN is a cross-entropy loss. Training of the encoder 728 and/or decoder 740 may be performed by differentiating the task losses (i.e., losses of the task-NNs) and the compression losses with respect to the parameters of the encoder 728 and/or decoder 740, thus obtaining gradients of the loss with respect to those parameters, and then updating the parameters of the encoder and/or decoder based on those gradients, by using a neural network optimization routine such as Stochastic Gradient Descent or Adam. In an additional or alternative embodiment, alternatively or in addition to the task losses, a feature-reconstruction error may be used as a training loss, such as the Mean Squared Error between the enhanced decoded features 750 and the original features 713.

The examples described herein are not limited to any particular method for "Compute difference" 720 or "Compute sum" 748. For example, "Compute difference" 720 may derive a component-wise scalar difference of the two input tensors, and respectively "Compute sum" 748 may derive a component-wise scalar sum of the two input tensors. Another example for "Compute sum" 748 is a neural network which may be trained together with the encoder and decoder neural networks (respectively 728 and 740) for the feature-residual. Another example for "Compute difference" 720 is a neural network which may be trained together with the encoder and decoder neural networks (respectively 728 and 740) for the feature-residual.

Figure 9:
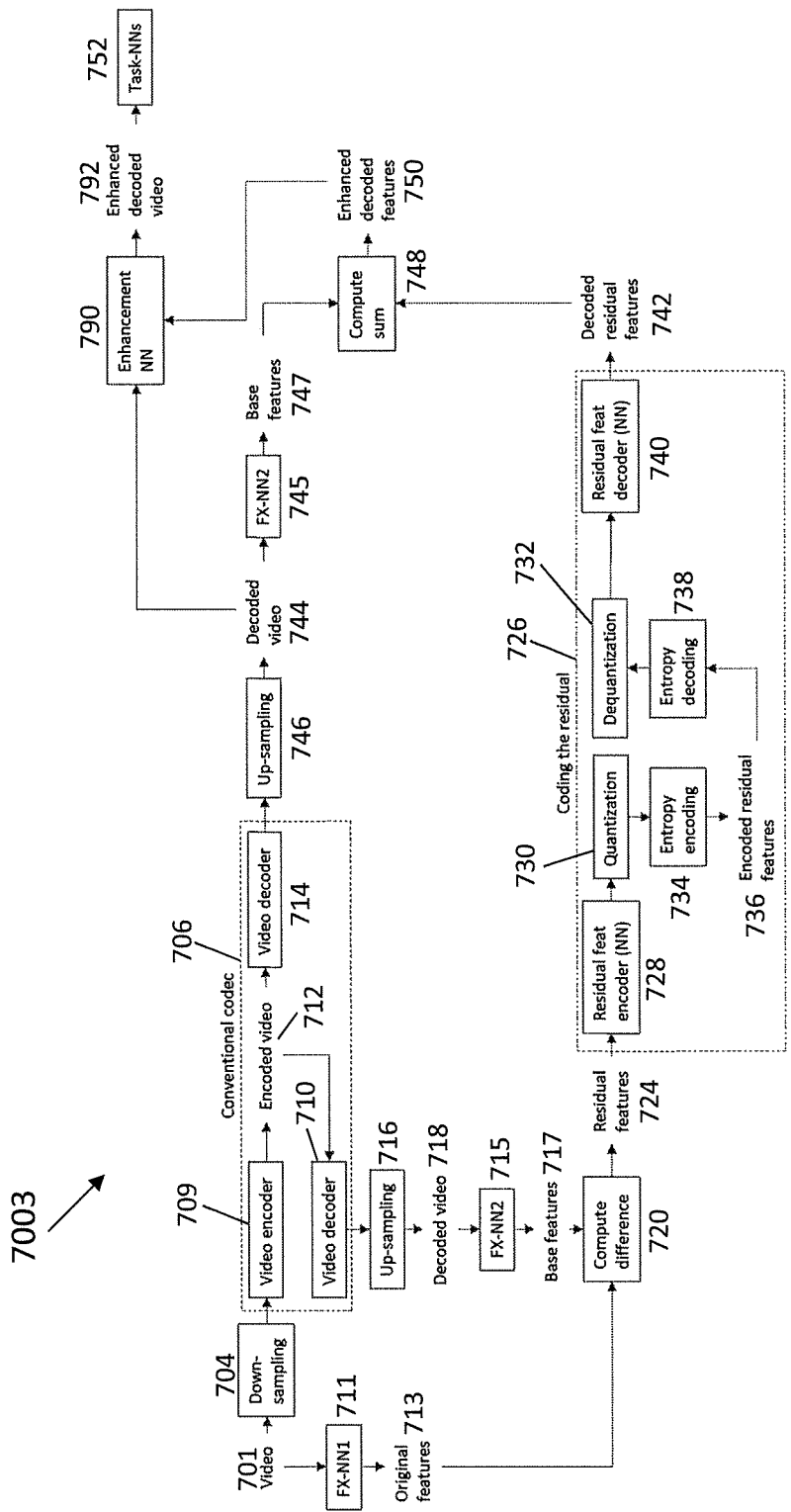
FIG. 9 is an example block diagram for implementing an embodiment that includes enhancing the decoded video using enhanced features.

Alternative embodiment: enhancing the decoded video using enhanced features. FIG. 9 is an example block diagram 7003 for implementing an embodiment that includes enhancing 790 the decoded video 744 using enhanced features 750. In this alternative embodiment, the task-NNs 752 are assumed to accept image or video as input. The video 744 decoded by the base layer decoder 714 is enhanced 790 based on the enhanced features 750. The enhanced features 750 are obtained in a similar way as described in the main embodiment of the examples described herein.

The enhancement 790 of the decoded video 744 may be performed for example by using an additional neural network, trained together with the other NNs in the encoder and decoder. FIG. 9 is an illustration of this embodiment.

Figure 10:
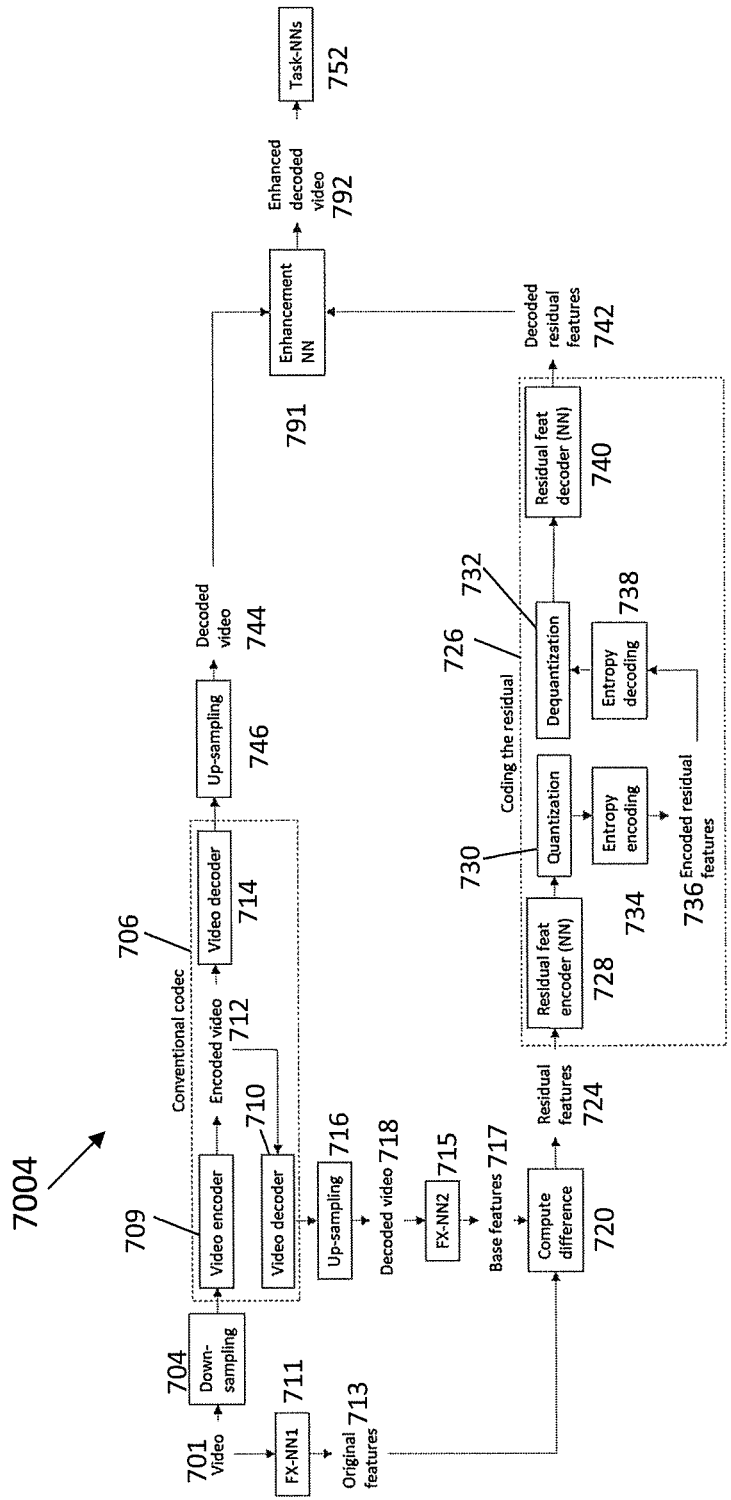
FIG. 10 is an example block diagram for implementing an embodiment that includes enhancing the decoded video using decoded residual features.

Alternative embodiment: enhancing the decoded video using decoded residual features. FIG. 10 is an example block diagram 7004 for implementing an embodiment that includes enhancing 791 the decoded video 744 using decoded residual features 742. In this alternative embodiment, the task-NNs 752 are assumed to accept image or video as input. The video 744 decoded by the base layer decoder 714 is enhanced 790 based on the decoded residual features 742. The decoded residual features 742 are obtained in a similar way as described in the main embodiment of the provided examples.

The enhancement 791 of the decoded video 744 may be performed for example by using an additional neural network, trained together with the other NNs in the encoder and decoder. FIG. 10 provides an illustration of this embodiment.

In FIG. 7, FIG. 8, FIG. 9, and FIG. 10, video decoder 710, and decoded video 718 are shown as being different entities, respectively, from video decoder 714 and decoded video 744. In some examples, the entities may be the same (e.g., the same data or copy of the same data, or the same module or copy of the same module). Furthermore, in FIG. 7, FIG. 8, and FIG. 9, feature extraction (FX-NN2) 715 and features 717 from decoded video 718 are shown as being different entities, respectively, from feature extraction (FX-NN2) 745 and features 747 from decoded video 744. In some examples, the entities may be the same (e.g., the same data or copy of the same data, or the same module or copy of the same module). Furthermore, in FIG. 8, FIG. 9, and FIG. 10, up-sampling 716 is shown as being a different entity from up-sampling 746. In some examples, up-sampling 716 and up-sampling 746 is the same entity.

Additional embodiment: enhance only a subset of features. In one alternative embodiment, only a subset of features extracted by FX-NN2 715 and/or FX-NN2 745 and/or FX-NN1 711 are selected for residual computation. Selection of such a subset may be done via selection of the most important features. One method for determining the most important features may consist of determining which features have higher average absolute value (L1 norm) in the original features 713 and/or in the base features 717, at the encoder side. For example, only two out of 128 feature maps may be determined to be important, and therefore the feature residual may be computed and encoded and decoded only for those two feature maps. Another method for determining the most important feature maps may consist of computing a first set of residual features 724 and then selecting only the residual features with average absolute value (L1 norm). Other suitable methods may be used for determining the most important features. The encoder may signal to the decoder, either in-band or out-of-band with respect to the bitstream of the feature-residual, identifiers of the selected features for which feature-residual is encoded. Examples of such identifiers may be indexes of the features, or other unique identifiers. At decoder side, these identifiers are used to determine which decoded base feature 747 need to be enhanced.

Additional embodiments: Quantization aspects. In an additional embodiment, a quantization operation is applied to the residual features 724 after difference computation 720.

In another embodiment, features 713 extracted 711 from the original video 701 and features 717 extracted 715 from decoded video 718 are initially quantized before the difference computation 720. The level of quantization may be determined by the accuracy and performance of the Task-NN 752 and/or available bandwidth. Quantization may be linear, piece-wise linear or even a learned function based on the Task-NN 752 accuracy.

In another embodiment, multiple task 752 accuracies may be combined and multiple different quantization schemes may be applied to different feature maps for residual calculation.

Additional embodiment: temporal features prediction. In another embodiment, features from frame at time t are extracted and then a difference between these features and features from previous frame at time t-1 is computed. This is done for both the original video 701 and the decoded video 718/744, thus obtaining two feature-differences. Then, a difference between these two feature-differences is computed. This difference of feature-differences is then encoded, instead of the difference of features. Alternatively, the coding of residual 726 may perform temporal prediction of the residual features.

Options for arranging the encoded video and encoded residual features. Embodiments similarly apply to an encoder side 701 that encodes a signal according to an option described below, and to a decoder side 703 that decodes a signal according to an option described below.

In an embodiment, the encoded video 712 complies with a conventional video bitstream format, such as H.266, and the encoded residual features 724 are present in the same video bitstream in a manner that a conventional video decoder 710/714 omits the encoded residual features 736. Such manners may include but are not limited to one or more of the following:

- The encoded residual features 736 are present in Supplemental Enhancement Information (SEI) messages in the video bitstream.
- The encoded residual features 736 are present in Network Abstraction Layer (NAL) units that are omitted by a conventional video decoder 710/714. For example, NAL units that have been left "unspecified" in a coding standard may be used or NAL units that were previously reserved for future extensions (when a conventional video bitstream format was specified) may be used.

In an embodiment, a multi-layer video bitstream format (such as h.266 or scalable HEVC) is used, where the format provides capability of separating the data into multiple scalability layers. The encoded video 712 resides in a first scalability layer that is independent of any other layers. The encoded residual features 736 are present in a second scalability layer that depends on the first layer. The bitstream may indicate the type of the second scalability layer and/or which residual features decoder 740 and/or feature extraction may be used for decoding the second scalability layer.

In an embodiment, a video bitstream comprising the encoded video 712 is present in a first track of a container file and encoded residual features 736 are present in a second track of the container file. The container file provides means for aligning or synchronizing samples of the first track and the second track so that the decoder side 703 is able to combine the base features 747 and the decoded residual features 742 that are time-aligned.

Figure 11:
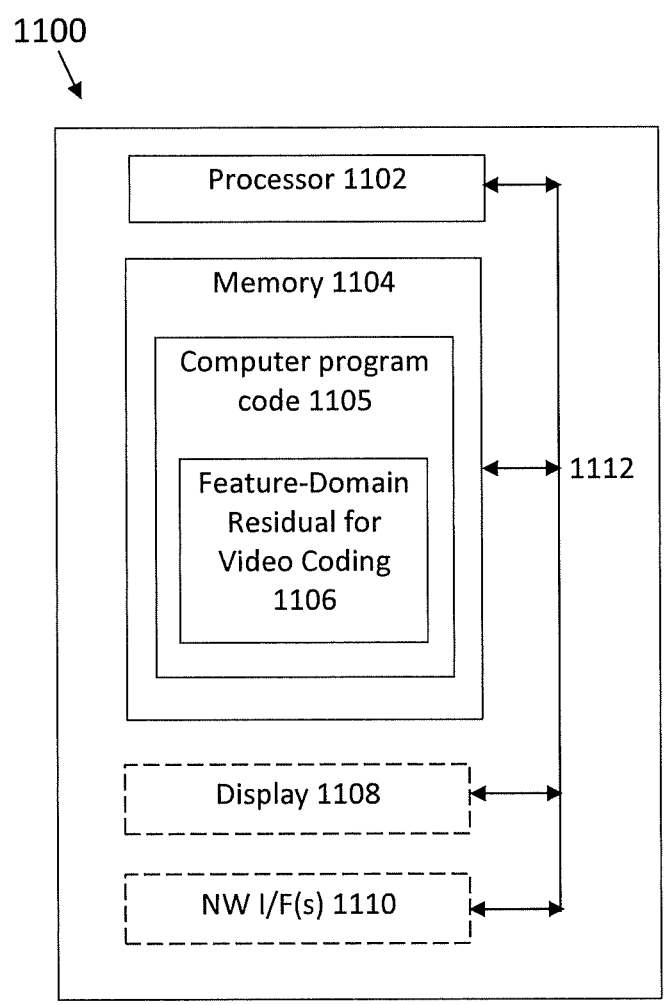
FIG. 11 is an example apparatus configured to implement feature-domain residual for video coding for machines, based on the examples described herein.

FIG. 11 is an example apparatus 1100, which may be implemented in hardware, configured to implement feature-domain residual for video coding, based on the examples described herein. The apparatus 1100 comprises a processor 1102, at least one non-transitory memory 1104 including computer program code 1105, wherein the at least one memory 1104 and the computer program code 1105 are configured to, with the at least one processor 1102, cause the apparatus to implement feature-domain residual for video coding 1106, based on the examples described herein. The apparatus 1100 optionally includes a display 1108 that may be used to display content during task/machine/NN processing or rendering. The apparatus 1100 optionally includes one or more network (NW) interfaces (I/F(s)) 1110. The NW I/F(s) 1110 may be wired and/or wireless and communicate over the Internet/other network(s) via any communication technique. The NW I/F(s) 1110 may comprise one or more transmitters and one or more receivers. The N/W I/F(s) 1110 may comprise standard well-known components such as an amplifier, filter, frequency-converter, (de)modulator, and encoder/decoder circuitry(ies) and one or more antennas. In some examples, the processor 1102 is configured to implement item 1106 without use of memory 1104.

The memory 1104 may be implemented using any suitable data storage technology, such as semiconductor based memory devices, flash memory, magnetic memory devices and systems, optical memory devices and systems, fixed memory and removable memory. The memory 1104 may comprise a database for storing data. Interface 1112 enables data communication between the various items of apparatus 1100, as shown in FIG. 11. Interface 1112 may be one or more buses, or interface 1112 may be one or more software interfaces configured to pass data between the items of apparatus 1100. For example, the interface 1112 may be one or more buses such as address, data, or control buses, and may include any interconnection mechanism, such as a series of lines on a motherboard or integrated circuit, fiber optics or other optical communication equipment, and the like. The apparatus 1100 need not comprise each of the features mentioned, or may comprise other features as well. The apparatus 1100 need not comprise each of the features mentioned, or may comprise other features as well. The apparatus 1100 may be an embodiment of apparatuses shown in FIG. 1, FIG. 2, FIG. 3, FIG. 4, FIG. 5, FIG. 6, FIG. 7, FIG. 8, FIG. 9, or FIG. 10.

Figure 12:
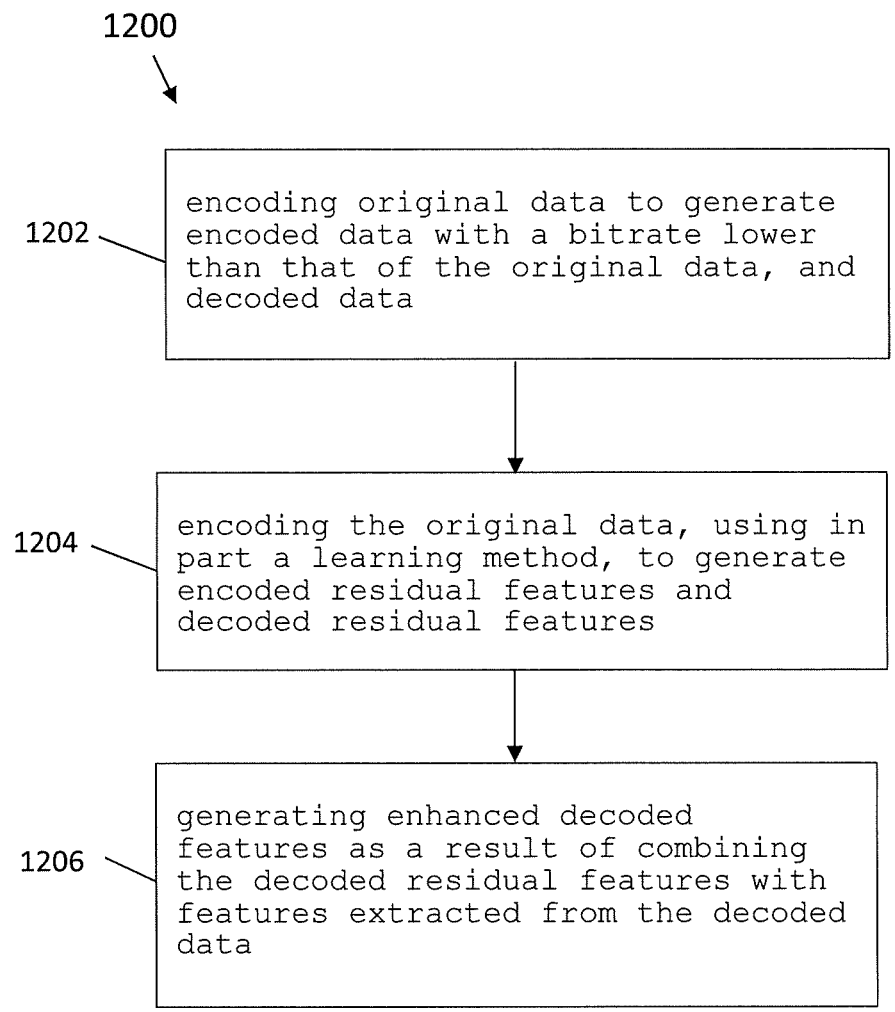
FIG. 12 is an example method to implement feature-domain residual for video coding for machines, based on the examples described herein.

FIG. 12 is an example method 1200 to implement feature-domain residual for video coding for machines, based on the examples described herein. At 1202, the method includes encoding original data to generate encoded data with a bitrate lower than that of the original data, and decoded data. At 1204, the method includes encoding the original data, using in part a learning method, to generate encoded residual features and decoded residual features. At 1206, the method includes generating enhanced decoded features as a result of combining the decoded residual features with features extracted from the decoded data. Method 1200 may be implemented with an encoder.

Figure 13:
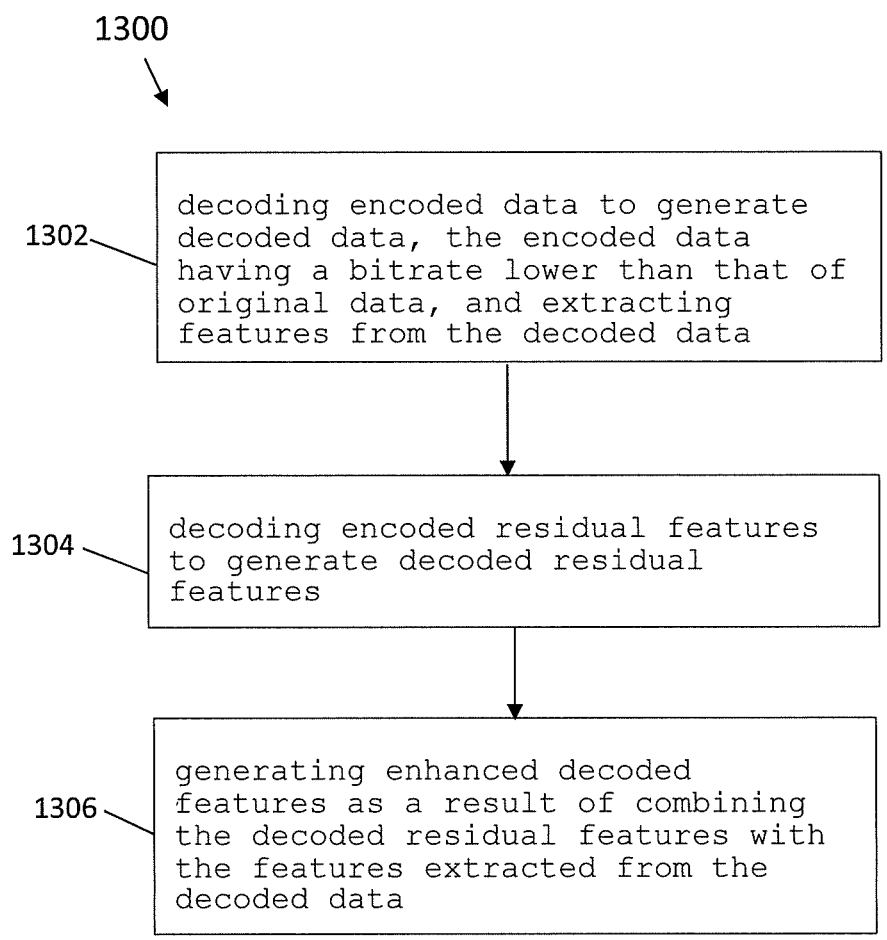
FIG. 13 is another example method to implement feature-domain residual for video coding for machines, based on the examples described herein.

FIG. 13 is another example method 1300 to implement feature-domain residual for video coding for machines, based on the examples described herein. At 1302, the method includes decoding encoded data to generate decoded data, the encoded data having a bitrate lower than that of original data, and extracting features from the decoded data. At 1304, the method includes decoding encoded residual features to generate decoded residual features. At 1306, the method includes generating enhanced decoded features as a result of combining the decoded residual features with the features extracted from the decoded data. Method 1300 may be implemented with a decoder.

References to a 'computer', 'processor', etc. should be understood to encompass not only computers having different architectures such as single/multi-processor architectures and sequential/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry may also be used to mean a function or a process used to execute a method.

An example apparatus includes at least one processor; and at least one non-transitory memory including computer program code; wherein the at least one memory and the computer program code are configured to, with the at least one processor, cause the apparatus at least to: encode original data with a first codec to generate encoded data with a bitrate lower than that of the original data, and decoded data; encode the original data with at least one second learned codec to generate encoded residual features and decoded residual features; and generate enhanced decoded features as a result of combining the decoded residual features with features extracted from the decoded data generated with the first codec.

The apparatus may further include wherein at least one machine processes or analyzes the decoded data using the enhanced decoded features.

The apparatus may further include wherein the at least one memory and the computer program code are further configured to, with the at least one processor, cause the apparatus at least to: generate enhanced decoded video resulting from combining the decoded data with the enhanced decoded features; wherein at least one machine processes or analyzes the decoded data using the enhanced decoded video.

The apparatus may further include wherein the at least one memory and the computer program code are further configured to, with the at least one processor, cause the apparatus at least to: rather than generate the enhanced decoded features, generate enhanced decoded video resulting from combining the decoded data with the decoded residual features; wherein at least one machine processes or analyzes the decoded data using the enhanced decoded video.

The apparatus may further include wherein the residual features are encoded using at least one neural network, and the residual features are decoded using at least one neural network.

The apparatus may further include wherein the features extracted from the decoded data generated with the first codec are extracted using a neural network.

The apparatus may further include wherein the at least one memory and the computer program code are further configured to, with the at least one processor, cause the apparatus at least to: extract features from the original data; extract features from the decoded data; and generate the residual features, prior to being encoded, as a result of computing a difference between the features extracted from the decoded data and the features extracted from the original data.

The apparatus may further include wherein the extracting of the features from the original data is performed using a neural network; and wherein the extracting of the features from the decoded data is performed using a neural network.

The apparatus may further include wherein the enhanced decoded video is generated using a neural network.

The apparatus may further include wherein the enhanced decoded video is generated using a neural network.

The apparatus may further include wherein the residual features are encoded using an image of a video encoder, the encoding of the residual features comprising converting the residual features to feature map images; and wherein the residual features are decoded using an image of a video decoder, the decoding of the residual features comprising converting decoded feature map images to the decoded residual features.

The apparatus may further include wherein the original data is video.

The apparatus may further include wherein the at least one memory and the computer program code are further configured to, with the at least one processor, cause the apparatus at least to: downsample the original data prior to encoding the original data with the first codec; and upsample the decoded data generated with the first codec.

The apparatus may further include wherein the encoding of the original data with the at least one second learned codec comprises: quantization and entropy encoding to generate the encoded residual features; and entropy decoding and dequantization to generate the decoded residual features.

The apparatus may further include wherein the enhanced decoded features are generated as a result of computing a sum of the decoded residual features and the features extracted from the decoded data generated with the first codec.

The apparatus may further include wherein the sum operation is replaced with an operation performed with a neural network.

The apparatus may further include wherein the difference operation is replaced with an operation performed with a neural network.

The apparatus may further include wherein at least two neural networks used in a process to generate the enhanced decoded features are trained together.

An example apparatus includes means for encoding original data with a first codec to generate encoded data with a bitrate lower than that of the original data, and decoded data; means for encoding the original data with at least one second learned codec to generate encoded residual features and decoded residual features; and means for generating enhanced decoded features as a result of combining the decoded residual features with features extracted from the decoded data generated with the first codec.

The apparatus may further include wherein at least one machine processes or analyzes the decoded data using the enhanced decoded features.

The apparatus may further include: means for generating enhanced decoded video resulting from combining the decoded data with the enhanced decoded features; wherein at least one machine processes or analyzes the decoded data using the enhanced decoded video.

The apparatus may further include wherein the enhanced decoded video is generated using a neural network.

The apparatus may further include means for, rather than generating the enhanced decoded features, generating enhanced decoded video resulting from combining the decoded data with the decoded residual features; wherein at least one machine processes or analyzes the decoded data using the enhanced decoded video.

The apparatus may further include wherein the enhanced decoded video is generated using a neural network.

The apparatus may further include wherein the residual features are encoded using at least one neural network, and the residual features are decoded using at least one neural network.

The apparatus may further include wherein the features extracted from the decoded data generated with the first codec are extracted using a neural network.

The apparatus may further include means for extracting features from the original data; means for extracting features from the decoded data; and means for generating the residual features, prior to being encoded, as a result of computing a difference between the features extracted from the decoded data and the features extracted from the original data.

The apparatus may further include wherein the extracting of the features from the original data is performed using a neural network; and wherein the extracting of the features from the decoded data is performed using a neural network.

The apparatus may further include wherein the difference operation is replaced with an operation performed with a neural network.

The apparatus may further include wherein the residual features are encoded using an image of a video encoder, the encoding of the residual features comprising converting the residual features to feature map images; and wherein the residual features are decoded using an image of a video decoder, the decoding of the residual features comprising converting decoded feature map images to the decoded residual features.

The apparatus may further include wherein the original data is video.

The apparatus may further include means for downsampling the original data prior to encoding the original data with the first codec; and means for upsampling the decoded data generated with the first codec.

The apparatus may further include wherein the encoding of the original data with the at least one second learned codec comprises: quantization and entropy encoding to generate the encoded residual features; and entropy decoding and dequantization to generate the decoded residual features.

The apparatus may further include wherein the enhanced decoded features are generated as a result of computing a sum of the decoded residual features and the features extracted from the decoded data generated with the first codec.

The apparatus may further include wherein the sum operation is replaced with an operation performed with a neural network.

The apparatus may further include wherein at least two neural networks used in a process to generate the enhanced decoded features are trained together.

An example method includes encoding original data to generate encoded data with a bitrate lower than that of the original data, and decoded data; encoding the original data, using in part a learning method, to generate encoded residual features and decoded residual features; and generating enhanced decoded features as a result of combining the decoded residual features with features extracted from the decoded data.

An example non-transitory program storage device readable by a machine, tangibly embodying a program of instructions executable by the machine for performing operations may be provided, the operations comprising: encoding original data to generate encoded data with a bitrate lower than that of the original data, and decoded data; encoding the original data, using in part a learning method, to generate encoded residual features and decoded residual features; and generating enhanced decoded features as a result of combining the decoded residual features with features extracted from the decoded data.

An example apparatus may include circuitry configured to encode original data with a first codec to generate encoded data with a bitrate lower than that of the original data, and decoded data; circuitry configured to encode the original data with at least one second learned codec to generate encoded residual features and decoded residual features; and circuitry configured to generate enhanced decoded features as a result of combining the decoded residual features with features extracted from the decoded data generated with the first codec.

An example apparatus includes means for decoding encoded data to generate decoded data, the encoded data having a bitrate lower than that of original data, and means for extracting features from the decoded data; means for decoding encoded residual features to generate decoded residual features; and means for generating enhanced decoded features as a result of combining the decoded residual features with the features extracted from the decoded data.

The apparatus may further include means for processing or analyzing the enhanced decoded features using at least one task neural network.

The apparatus may further include means for generating enhanced decoded video as a result of combining the decoded data with the enhanced decoded features; wherein the combining of the decoded data with the enhanced decoded features to generate the enhanced decoded video is performed using a neural network; and means for processing or analyzing the enhanced decoded video using at least one task neural network.

The apparatus may further include means for generating enhanced decoded video as a result of combining the decoded data with the decoded residual features; wherein the combining of the decoded data with the decoded residual features to generate the enhanced decoded video is performed using a neural network; and means for processing or analyzing the enhanced decoded video using at least one task neural network.

The apparatus may further include wherein the features are extracted from the decoded data using a neural network; and the encoded residual features are decoded using a neural network.

The apparatus may further include wherein the combining of the decoded residual features with the features extracted from the decoded data to generate the enhanced decoded features is a summation of the decoded residual features and the features extracted from the decoded data.

The apparatus may further include wherein the encoded residual features are a difference between features extracted from the original data, and features extracted from preliminary decoded data or the features extracted from the decoded data.

The apparatus may further include wherein the decoded residual features are decoded using entropy decoding and dequantization.

The apparatus may further include wherein the decoded residual features are decoded using an image of a video decoder, the decoding of the residual features comprising converting decoded feature map images to the decoded residual features.

The apparatus may further include wherein the original data is video data.

An example apparatus includes at least one processor; and at least one non-transitory memory including computer program code; wherein the at least one memory and the computer program code are configured to, with the at least one processor, cause the apparatus at least to: decode encoded data to generate decoded data, the encoded data having a bitrate lower than that of original data, and extract features from the decoded data; decode encoded residual features to generate decoded residual features; and generate enhanced decoded features as a result of combining the decoded residual features with the features extracted from the decoded data.

The apparatus may further include wherein the at least one memory and the computer program code are further configured to, with the at least one processor, cause the apparatus at least to: process or analyze the enhanced decoded features using at least one task neural network.

The apparatus may further include wherein the at least one memory and the computer program code are further configured to, with the at least one processor, cause the apparatus at least to: generate enhanced decoded video as a result of combining the decoded data with the enhanced decoded features; wherein the combining of the decoded data with the enhanced decoded features to generate the enhanced decoded video is performed using a neural network; and process or analyze the enhanced decoded video using at least one task neural network.

The apparatus may further include wherein the at least one memory and the computer program code are further configured to, with the at least one processor, cause the apparatus at least to: generate enhanced decoded video as a result of combining the decoded data with the decoded residual features; wherein the combining of the decoded data with the decoded residual features to generate the enhanced decoded video is performed using a neural network; and process or analyze the enhanced decoded video using at least one task neural network.

The apparatus may further include wherein the features are extracted from the decoded data using a neural network; and the encoded residual features are decoded using a neural network.

The apparatus may further include wherein the combining of the decoded residual features with the features extracted from the decoded data to generate the enhanced decoded features is a summation of the decoded residual features and the features extracted from the decoded data.

The apparatus may further include wherein the encoded residual features are a difference between features extracted from the original data, and features extracted from preliminary decoded data or the features extracted from the decoded data.

The apparatus may further include wherein the decoded residual features are decoded using entropy decoding and dequantization.

The apparatus may further include wherein the decoded residual features are decoded using an image of a video decoder, the decoding of the residual features comprising converting decoded feature map images to the decoded residual features.

The apparatus may further include wherein the original data is video data.

An example method includes decoding encoded data to generate decoded data, the encoded data having a bitrate lower than that of original data, and extracting features from the decoded data; decoding encoded residual features to generate decoded residual features; and generating enhanced decoded features as a result of combining the decoded residual features with the features extracted from the decoded data.

An example non-transitory program storage device readable by a machine, tangibly embodying a program of instructions executable by the machine for performing operations is provided, the operations comprising: decoding encoded data to generate decoded data, the encoded data having a bitrate lower than that of original data, and extracting features from the decoded data; decoding encoded residual features to generate decoded residual features; and generating enhanced decoded features as a result of combining the decoded residual features with the features extracted from the decoded data.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

3GPP 3rd Generation Partnership Project
4G fourth generation of broadband cellular network technology
5G fifth generation cellular network technology
802.x family of IEEE standards dealing with local area networks and metropolitan area networks
a.k.a. also known as
CDMA code-division multiple access
DCT discrete cosine transform
DSP digital signal processor
FDMA frequency division multiple access
FX-NN feature extraction neural network
GSM Global System for Mobile communications
H.222.0 MPEG-2 Systems, standard for the generic coding of moving pictures and associated audio information
H.26x family of video coding standards in the domain of the ITU-T
HEVC high efficiency video coding, also known as H.265 and MPEG-H Part 2
IBC intra block copy
IEC International Electrotechnical Commission
IEEE Institute of Electrical and Electronics Engineers
I/F interface
IMD integrated messaging device
IMS instant messaging service
IoT internet of things
IP internet protocol ISO International Organization for Standardization
ISOBMFF ISO base media file format
ITU International Telecommunication Union
ITU-T ITU Telecommunication Standardization Sector
LTE long-term evolution
MMS multimedia messaging service
MPEG moving picture experts group
MPEG-2 H.222/H.262 as defined by the ITU
MPEG-H MPEG for Heterogeneous Environments
MSE mean squared error
NAL network abstraction layer
NN neural network
N/W or NW network
PC personal computer
PDA personal digital assistant
PID packet identifier
PLC power line communication
PSNR peak signal-to-noise ratio
QP quantization parameter
RFID radio frequency identification
RFM reference frame memory
SEI supplemental enhancement information
SMS short messaging service
SSIM structural similarity
task-NN task neural network
TCP-IP transmission control protocol-internet protocol
TDMA time divisional multiple access
TS transport stream
TV television
UICC Universal Integrated Circuit Card
UMTS Universal Mobile Telecommunications System
USB Universal Serial Bus
VCM video coding for machines
VVC versatile video coding
WLAN wireless local area network

What is claimed is:

1. An apparatus comprising:
   at least one processor; and
   at least one non-transitory memory including computer program code;
   wherein the at least one memory and the computer program code are configured to, with the at least one processor, cause the apparatus at least to:
   downsample original data to a lower resolution prior to encoding the original data;
   encode the downsampled original data with a first codec to generate encoded data with a bitrate lower than that of the original data, and decode the encoded data to generate decoded data;
   encode the original data with at least one second learned codec to generate encoded residual features and decoded residual features;
   generate enhanced decoded features as a result of combining the decoded residual features with features extracted from the decoded data generated with the first codec;
   wherein the decoded data and the enhanced decoded features are configured to be processed or analyzed with at least one machine;
   generate enhanced decoded video resulting from combining the decoded data with the enhanced decoded features;
   wherein the at least one machine processes or analyzes the decoded data using the enhanced decoded video.

2. The apparatus of claim 1, wherein the at least one machine comprises at least one task neural network.

3. The apparatus of claim 1, wherein the enhanced decoded video is generated using a neural network.

4. The apparatus of claim 1, wherein the at least one memory and the computer program code are further configured to, with the at least one processor, cause the apparatus at least to:
   generate the enhanced decoded video resulting from combining the decoded data with the decoded residual features.

5. The apparatus of claim 4, wherein the enhanced decoded video is generated using a neural network.

6. The apparatus of claim 1, wherein the residual features are encoded using at least one neural network of the at least one second learned codec, and the encoded residual features are decoded using at least one neural network of the at least one second learned codec.

7. The apparatus of claim 1, wherein the features extracted from the decoded data generated with the first codec are extracted using a neural network.

8. The apparatus of claim 1, wherein the at least one memory and the computer program code are further configured to, with the at least one processor, cause the apparatus at least to:
   extract features from the original data;
   extract features from the decoded data; and
   generate the residual features, prior to being encoded, as a result of computing a difference between the features extracted from the decoded data and the features extracted from the original data.

9. An apparatus comprising:
   at least one processor; and
   at least one non-transitory memory including computer program code;
   wherein the at least one memory and the computer program code are configured to, with the at least one processor, cause the apparatus at least to:
   decode encoded data to generate decoded data, the encoded data having a bitrate lower than that of original data, and extract features from the decoded data;
   wherein the encoded data is generated from downsampling the original data to a lower resolution prior to encoding the original data, and encoding the downsampled original data with a codec;
   decode encoded residual features to generate decoded residual features;
   generate enhanced decoded features as a result of combining the decoded residual features with the features extracted from the decoded data;
   wherein the enhanced decoded features are configured to be processed or analyzed with at least one machine;
   generate enhanced decoded video as a result of combining the decoded data with the enhanced decoded features; and
   process or analyze the enhanced decoded video using at least one machine task.

10. The apparatus of claim 9, wherein the at least one machine comprises at least one task neural network.

11. The apparatus of claim 9,
    wherein the combining of the decoded data with the enhanced decoded features to generate the enhanced decoded video is performed using a neural network; and
    wherein the at least one machine task used to process or analyze the enhanced decoded video comprises at least one task neural network.

12. The apparatus of claim 9, wherein the at least one memory and the computer program code are further configured to, with the at least one processor, cause the apparatus at least to:
  generate the enhanced decoded video as a result of combining the decoded data with the decoded residual features;
  wherein the combining of the decoded data with the decoded residual features to generate the enhanced decoded video is performed using a neural network; and
  wherein the at least one machine task used to process or analyze the enhanced decoded video comprises at least one task neural network.

13. The apparatus of claim 9,
  wherein the features are extracted from the decoded data using a neural network; and
  wherein the encoded residual features are decoded using a neural network of a learned codec.

14. The apparatus of claim 9, wherein the combining of the decoded residual features with the features extracted from the decoded data to generate the enhanced decoded features is a summation of the decoded residual features and the features extracted from the decoded data.

15. The apparatus of claim 9, wherein the encoded residual features are a difference between features extracted from the original data, and features extracted from preliminary decoded data or the features extracted from the decoded data.

16. The apparatus of claim 9, wherein the decoded residual features are decoded using entropy decoding and dequantization.

17. The apparatus of claim 9, wherein the decoded residual features are decoded using an image of a video decoder, the decoding of the residual features comprising converting decoded feature map images to the decoded residual features.

18. The apparatus of claim 9, wherein the original data is video data.

19. A method comprising:
  decoding encoded data to generate decoded data, the encoded data having a bitrate lower than that of original data, and extracting features from the decoded data;
  wherein the encoded data is generated from downsampling the original data to a lower resolution prior to encoding the original data, and encoding the downsampled original data with a codec;
  decoding encoded residual features to generate decoded residual features;
  generating enhanced decoded features as a result of combining the decoded residual features with the features extracted from the decoded data;
  wherein the enhanced decoded features are configured to be processed or analyzed with at least one machine;
  generate enhanced decoded video as a result of combining the decoded data with the enhanced decoded features; and
  process or analyze the enhanced decoded video using at least one machine task.

20. The method of claim 19, wherein the at least one machine comprises at least one task neural network.

* * * * *